(12) United States Patent
Ramirez

(10) Patent No.: US 6,777,928 B2
(45) Date of Patent: Aug. 17, 2004

(54) ROTARY MAGNETIC POSITION SENSOR HAVING POLE DIFFERENTIATED MAGNETS

(75) Inventor: Claudia Ramirez, El Paso, TX (US)

(73) Assignee: Delphi Technologies, Inc., Troy, MI (US)

( * ) Notice: Subject to any disclaimer, the term of this patent is extended or adjusted under 35 U.S.C. 154(b) by 51 days.

(21) Appl. No.: 10/308,481

(22) Filed: Dec. 3, 2002

(65) Prior Publication Data

US 2004/0104720 A1 Jun. 3, 2004

(51) Int. Cl.⁷ ............................ G01R 7/30; G01B 33/06
(52) U.S. Cl. .............................. 324/207.25; 324/207.2; 324/207.21
(58) Field of Search .................. 324/207.25, 207.21, 324/207.2, 173, 174; 335/296, 302, 306; 273/239, 456, 138.2, 126 A

(56) References Cited

U.S. PATENT DOCUMENTS

| 4,392,375 A | 7/1983 | Eguchi et al. ......... 324/207.21 |
| 4,703,261 A | 10/1987 | Berchtold ............... 324/207.2 |
| 4,926,122 A | 5/1990 | Schroeder et al. ..... 324/207.13 |
| 5,148,106 A | 9/1992 | Ozawa .................. 324/207.25 |
| 5,252,919 A | 10/1993 | Uemura ................. 324/207.25 |
| 5,544,000 A | 8/1996 | Suzuki et al. ............ 324/207.2 |
| 5,712,561 A * | 1/1998 | McCurley et al. ........ 324/207.2 |
| 5,754,042 A | 5/1998 | Schroeder et al. ..... 324/207.25 |
| 6,060,880 A | 5/2000 | Guyot et al. ............. 324/207.2 |
| 6,232,771 B1 | 5/2001 | Herden et al. ......... 324/207.25 |
| 6,374,664 B1 | 4/2002 | Bauer et al. |
| 6,486,764 B2 | 11/2002 | Byram |

FOREIGN PATENT DOCUMENTS

| CA | 1232957 | 2/1988 | |
| DE | 2001368 | 7/1971 | ............. 324/207.2 |
| JP | 58-168913 | 10/1983 | ............. 324/207.2 |
| JP | 02-122205 | 5/1990 | ............. 324/207.2 |
| JP | 403270001 A * | 12/1991 | |
| JP | 4-20812 | 1/1992 | ............ 324/207.21 |

* cited by examiner

Primary Examiner—N. Le
Assistant Examiner—Reena Aurora
(74) Attorney, Agent, or Firm—Jimmy L. Funke

(57) ABSTRACT

The present invention is a rotary magnetic position sensor having a pair of pole differentiated permanent magnets, wherein rotation of a magnetic field relative to a magneto-sensitive device provides a varying output of the magneto-sensitive device that varies sinusoidally with the angle of relative rotation. The magnetic pole differentiation is achieved by an external asymmetric geometrical feature of the magnets, as for example a wedge shape involving a pole face chamfer or a corner chamfer at a same polarity pole face.

4 Claims, 3 Drawing Sheets

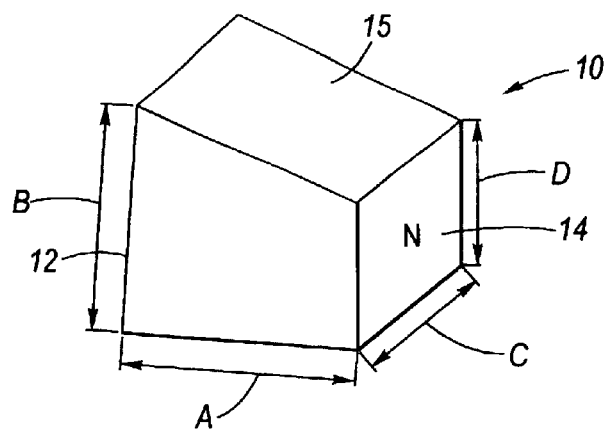
*Fig. 1*
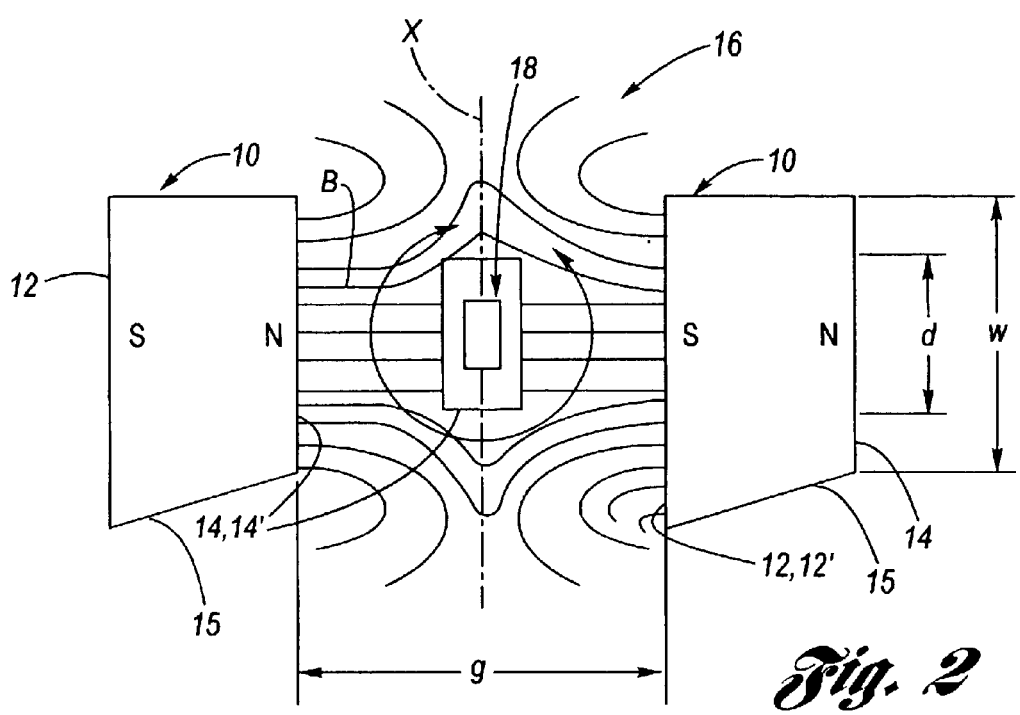
*Fig. 2*
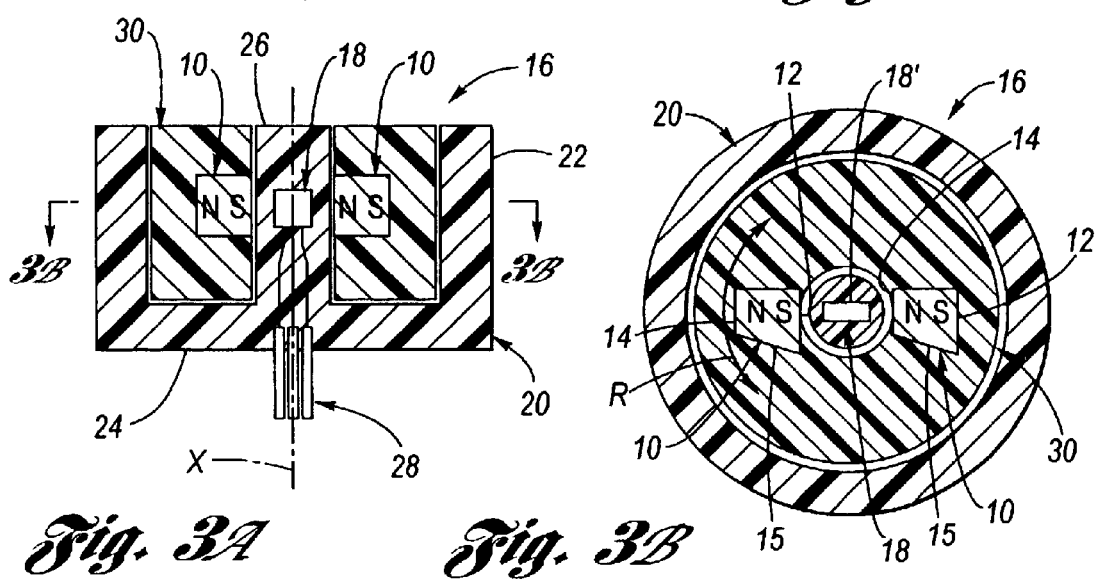
*Fig. 3A*   *Fig. 3B*

ROTARY MAGNETIC POSITION SENSOR HAVING POLE DIFFERENTIATED MAGNETS

TECHNICAL FIELD

The present invention relates to rotary magnetic position sensors used to measure angular displacements, and more particularly to permanent magnets used therein. Still more particularly, the present invention relates to pole differentiated permanent magnets used in the aforesaid application.

BACKGROUND OF THE INVENTION

The use of magnetoresistors (MRs) and Hall devices as position sensors is well known in the art. For example, a magnetically biased differential MR sensor may be used, for example, to sense angular position of a rotating toothed wheel.

Position sensors with digital outputs provide discrete position information only whereas an analog position sensor can provide both position information and outputs that can be used to drive an electric motor or other similar electromechanical devices. Many of these devices are driven by sinusoidal excitations as a function of position. Consequently, an analog position sensor having an output that varies sinusoidally with position could be used to generate absolute angular positions as, for example, an electrical power steering system to measure the angle of rotation of the steering wheel, and/or reference signals to produce the desired sinusoidal phase drive currents and voltages to drive electric motors and other similar electromechanical devices. Applications may further include throttle position sensors, pedal position sensors in drive-by-wire systems, body height position sensors for automotive suspension systems, a 3-phase sine generator for brushless motors, a sine/cosine resolver for servo motors, etc.

The operational principle of an angle encoder sensor is based upon the property of Hall plates and semiconductor magnetoresistors, collectively referred to herein as magnetosensitive devices, to sense only the normal component of the magnetic field passing through them. Consequently, if a constant and uniform magnetic field is rotated in the plane perpendicular to the surface of a magnetosensitive device, the output signal will vary as the cosine of the angle between the direction of the incident magnetic field lines and the line normal to the surface of the device. It is preferred in this regard, that the magnetosensitive device be linear in its response to change in direction of the incident magnetic field, such as that provided by Hall plates; however, magnetoresistors operating in their linear region can also be used. In addition, operation over any ambient temperature range may require temperature compensated magnetosensitive devices. Also, it should be noted that included by the term "magnetosensitive devices" are ferromagnetic magnetoresistors, including giant magnetoresistor (GMR) sensors, which can also be used although these are less preferred because their resistance versus magnetic flux density saturates at a relatively low level compared with Hall sensors that do not saturate.

The assembly of rotary magnetic position sensors involves two permanent magnets in diametric opposition to each other, wherein the facing poles are of opposite polarity so as to thereby provide a generally uniform magnetic field across the space occupied by the magnetically sensitive sensor device. One technique used in the assembly is to insert non-magnetized blocks of magnetizable material, over-mold the magnet carrying component, then magnetize the blocks by an external magnet to thereby convert the blocks into permanent magnets having facing poles with opposed polarity.

Problematically, however, if pre-magnetized permanent magnets are placed into a mold tool for forming the magnet carrying component, and the magnets are identical, there could be a chance that like poles could face each other, rather than unlike poles facing each other.

Accordingly, what remains needed is a compact inexpensive contactless position sensor having pole differentiated permanent magnets, wherein the magnets provide sinusoidally varying output suitable for specialized sensing schemes.

SUMMARY OF THE INVENTION

The present invention is a rotary magnetic position sensor (also referred to as an analog analog encoder) having a pair of pole differentiated permanent magnets, wherein rotation of a magnetic field relative to a magnetosensitive device provides a varying output of the magnetosensitive device that varies sinusoidally with the angle of relative rotation.

The rotary magnetic position sensor according to the present invention includes a non-magnetic stator which is preferably cup shaped, having an outer annulus, a bottom disk and a central post connected with the bottom disk and concentrically positioned relative to the outer annulus. Located within the central post is located at least one magnetosensitive device, for example a Hall sensor or a magnetoresistor, the leads of which pass out from the cup. A rotor in the form of a ring captured between the central post and the outer annulus, wherein the ring is rotatable relative to the stator.

A pair of permanent biasing magnets are located in the rotor in mutually diametrically opposed relation, with unlike poles facing each other so as to provide a magnetic field incident upon the at least one magnetosensitive device. In this regard, each magnet has an external asymmetric geometrical feature which defines indexing of the polarity of the magnet. For example, in a pair of wedge shaped permanent magnets, both magnets have an identical smaller area pole face, and an identical larger area opposite pole face, and for both magnets the north pole is at one of the larger or smaller pole face, and the south pole is at the other pole face. As a result, mere visual inspection, or physical contact, allows immediate distinguishment as to whether opposite poles face each other. For example, if the north pole is at the larger area pole face and the south pole is at the smaller area pole face, then for the magnets to have opposed poles facing each other, one facing pole face must be the larger area pole face and the other facing pole face must be the smaller area pole face.

In operation, as the rotor rotates relative to the stator, the angle of the incident magnetic field changes relative to the magnetosensitive device, thereby causing the output from the device to vary sinusoidally with angular position.

Accordingly, it is an object of the present invention to provide a rotary magnetic position sensor having a pair of permanent magnets, wherein the magnets are geometrically pole differentiated.

This, and additional objects, features and benefits of the present invention will become apparent from the following specification.

BRIEF DESCRIPTION OF THE DRAWINGS

FIG. 1 is a perspective view of a pole differentiated permanent magnet according to the present invention.

FIG. 2 is a magnetic field diagram of a rotary magnetic position sensor utilizing a pair of pole differentiated permanent magnets as shown at FIG. 1.

FIG. 3A is a partly sectional side view of a rotary magnetic position sensor incorporating a pair of pole differentiated permanent magnets according to the present invention.

FIG. 3B is a partly sectional view, seen along line 3B—3B in FIG. 3A.

DESCRIPTION OF THE PREFERRED EMBODIMENT

Figure 4:
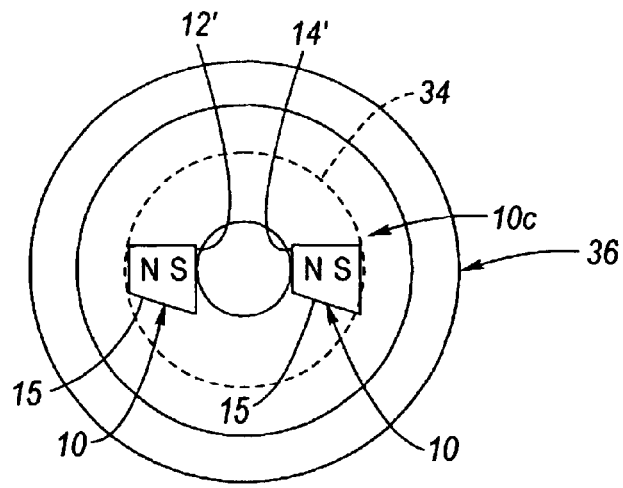
FIG. 4 is a schematic view of the bottom portion of a mold tool for providing the rotor of the rotary magnetic position sensor according to the present invention.

Turning attention now to the Drawings,

FIG. 1 depicts a pole differentiated permanent magnet 10 according to the present invention, wherein by preferred example, it has an external asymmetric geometrical feature in the form of a wedge shape incorporating a pole face chamfer 15. The wedge shape provides a larger area first pole face 12 and a smaller area second pole face 14, wherein both magnets identically have the same magnetic pole at the first and second pole faces, respectively (ie., for both magnets, the north pole is at the smaller pole face 14, as shown). A preferred magnet material is a rare earth, such as SmCo. By way merely of example, the dimensions of the wedge shape may be: A equal to about 6.3 mm, B equal to about 6 mm, C equal to about 6.3 mm and D equal to about 4.5 mm, wherein the pole face chamfer 15 is 1.5 mm.

FIG. 2 illustrates the principle of the present invention that a pair of pole differentiated permanent magnets 10 are provided for a rotary magnetic position sensor 16, wherein each magnet has identical pole indexing delineation. A magnetosensitive device 18, as for example a Hall sensor or a magnetoresistor, is located at the rotation axis X, wherein either the magnetosensitive device rotates relative to the magnets 10, or the magnets rotate relative to the magnetosensitive device.

The pair of magnets 10 are mutually separated by a gap g and have mutually facing pole faces 12', 14' having opposite polarity which thereby provide a generally uniform magnetic field B therebetween over a transverse distance d, wherein the pole faces have an effective pole face transverse distance W such that W>d sufficient such that the magentic field is generally uniform at the magnetosensitive device 18. By way of exemplification, the external asymmetric geometrical feature is provided by the wedge shape of FIG. 1, wherein it is visually and/or physically clear that the indexing of the pole faces is correct, in that as long as one facing polarity pole face has a smaller area than the other facing polarity pole face, the mutually facing pole faces must be of opposite polarity.

FIGS. 3A and 3B depict an example of a rotary position sensor 16' incorporating a pair of pole differentiated permanent magnets 10, wherein the pole differentiation is in the form of the wedge shaped external asymmetric geometrical feature as depicted at FIGS. 1 and 2.

A stator 20 in the form of a cup has an outer annulus 22, an integrally connected bottom disk 24 and a central post 26 connected with the bottom disk and concentrically positioned relative to the outer annulus. The stator 20 is composed of a nonmagnetic material, such as for example plastic. Inserted or molded within the central post 26 is located a magnetosensitive device 18, its sensing surface 18' being oriented parallel to the axis of symmetry X' of the stator 20. The magnetosensitive device 18 may be, for example, a Hall plate or at magnetoresistor, or a Hall plate or magnetoresistor with its interface electronics. The leads 28 of the magnetosensitive device 18 pass outwardly from the stator 20.

A rotor 30 in the form of a ring is captured between the central post 26 and the outer annulus 22, wherein the rotor is rotatable, preferably contactlessly, relative to the stator 20 about an axis of rotation, which axis is identically the axis of symmetry X'. For example, the rotor 30 may be connected to a rotatable shaft, and the stator 20 may be connected to a stationary article, or vice versa. The rotor 30 is composed of a non-magnetic material, such plastic, except as indicated hereinbelow. The rotation R of the rotor 30 may be unlimited or restricted to some predetermined angular interval (for example, for use in an automotive suspension leveling system or an automotive throttle position sensor).

A pair of permanent biasing magnets 10 are provided having pole differentiation, wherein each magnet has an external asymmetric geometrical feature which clearly provides polar indexing of the magnets. As indicated above, the external asymmetric geometrical feature is, by way of example, a wedge shape involving a pole face chamfer 15, as shown also at FIGS. 1 and 2. Each magnet 10 is rigidly affixed within the rotor 30.

As depicted at FIG. 4, the magnetic circuit 10c including the two bias magnets 10, and which may or may not include a return path ring 34 (shown in phantom), is placed into a mold tool 36 (the lower half being shown). The magnetic circuit 10c is then overmolded, for example with polybutylene terephthalate hydrolytically resistant plastic. The asymmetry of the geometry of the magnets 10 ensures the mutually facing pole faces 12', 14' have opposite polarity by mere visual inspection of the relative orientations of the external asymmetric geometrical feature of the magnets.

The bias magnets 10 provide a magnetic field perpendicular to the axis of symmetry X' so as to immerse the magnetosensitive device 18 in a constant incident magnetic field, as generally shown at FIG. 2. In this regard, FIGS. 4 and 5 graphically delineate expected performance characteristics of a rotary magnetic position sensor using pole differentiated biasing magnets 10.

FIG. 4 depicts plots 40 of the magnetic field flux versus angular rotation of the rotor 30 relative to the stator 20, using software modeling (as for example available from Ansoft Corp. of Pittsburgh, Pa. 15219) for a rotary magnetic position sensor having biasing magnets 10 as described above with a 1.5 mm pole face chamfer and a Hall type magnetosensitive device. The plots 40 are for center, down left and up right positions of the biasing magnets relative to the Hall type magnetosensitive device. Since there is minimal distance between the diagonals, the pole face chamfer may be implemented without risk to performance arising out of naturally occurring possible movements of the Hall type magnetosensitive device relative to the centerline between the biasing magnets and the Hall type magnetosensitive device.

Figure 5:
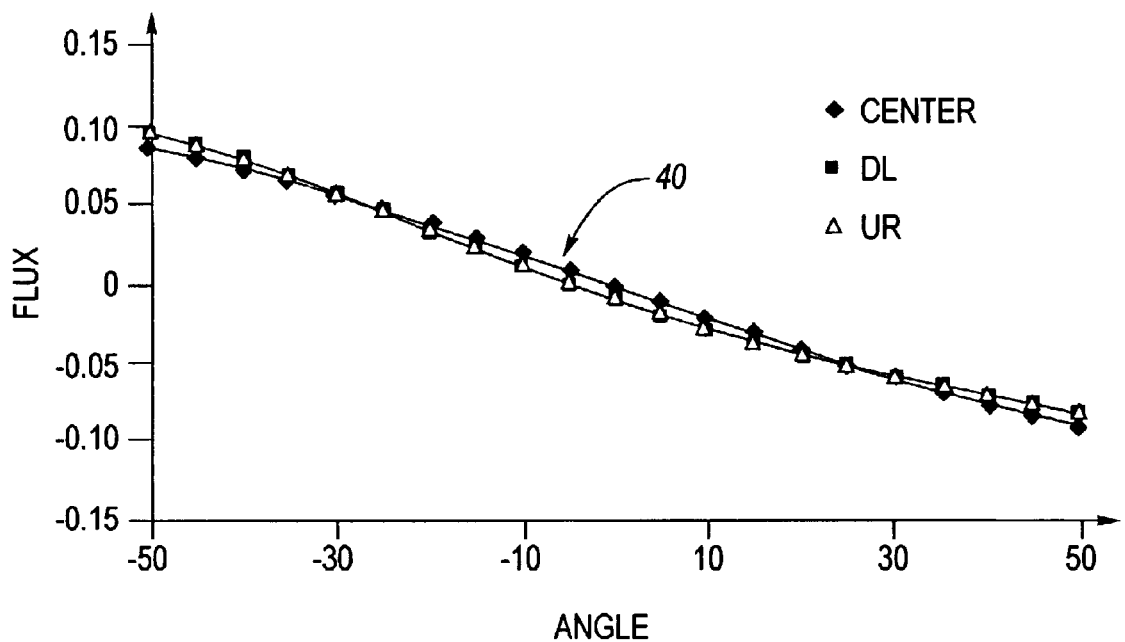
FIG. 5 is a magnetic field flux versus rotation angle plot for the a rotary Hall element position sensor utilizing a pair of pole differentiated permanent magnets according to the present invention.
Figure 6:
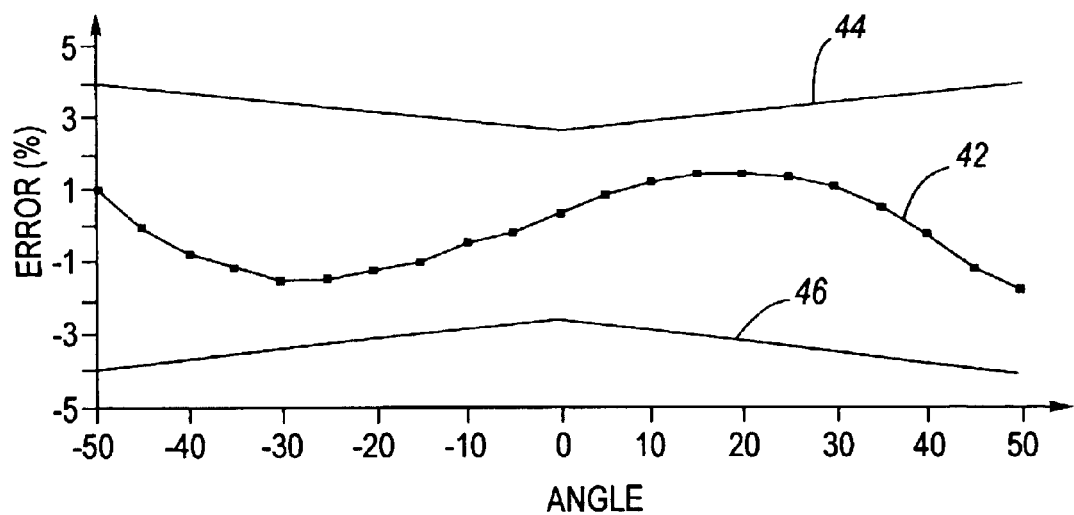
FIG. 6 is a performance plot for the a rotary Hall element position sensor utilizing a pair of pole differentiated permanent magnets according to the present invention.

FIG. 5 depicts a plot 42 of percent body position sensor error versus angular rotation of the rotor 30 relative to the stator 20 for an actual prototype magnetic rotary magnetic position sensor having pole differentiated biasing magnets as indicated hereinabove. Plot 42 indicates a very low percent of error with respect to linear response. The upper plot 44 and the lower plot 46 arc indicative of upper and lower mean temperature limits, respectively.

Figure 7:
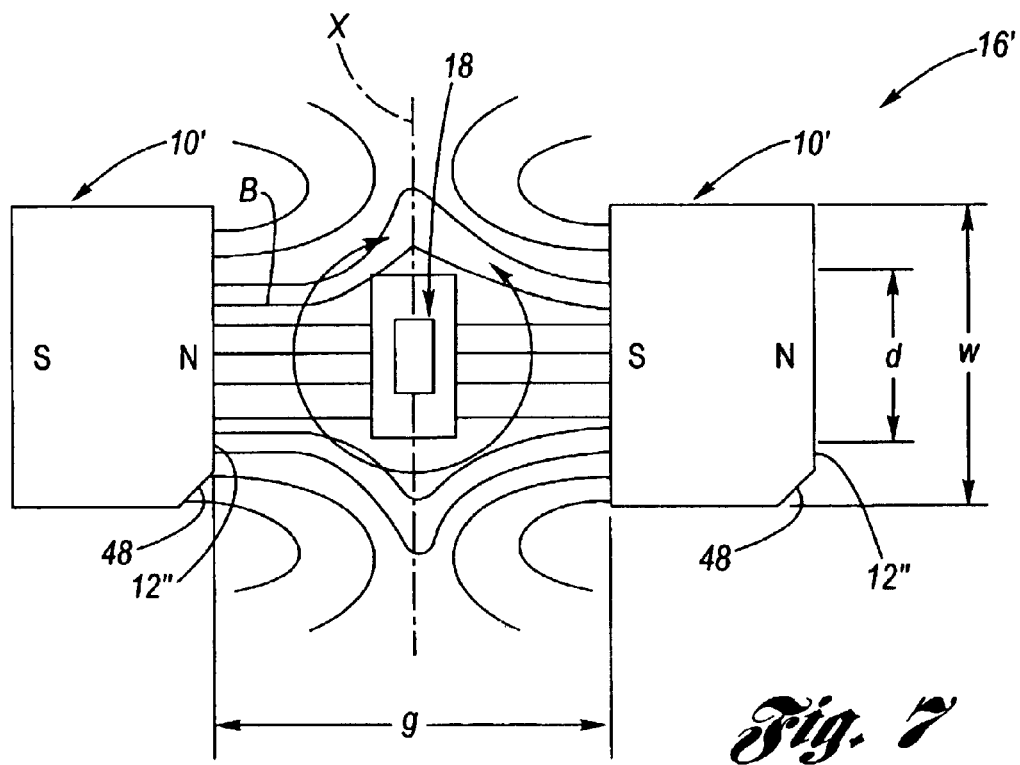
FIG. 7 is a magnetic field diagram of a rotary magnetic position sensor utilizing a pair of pole differentiated permanent magnets having a second exemplary external asymmetric geometrical feature.

FIG. 7 shows a rotary magnetic position sensor 16' similar to that of FIG. 2, now incorporating alternative pole differentiated permanent biasing magnets 10'. In this regard, both magnets 10' have an identical corner chamfer 48 at a same polarity pole face 12" constituting the external asymmetric geometrical feature.

To those skilled in the art to which this invention appertains, the above described preferred embodiment may be subject to change or modification. Such change or modification can be carried out without departing from the scope of the invention, which is intended to be limited only by the scope of the appended claims.

What is claimed is:

1. A rotary magnetic position sensor, comprising:
   a stator;
   at least one magnetosensitive device connected with said stator, said at least one magnetosensitive device having a sensing surface;
   a rotor mounted around said stator, wherein one of said stator and said rotor is rotatable about a rotation axis, wherein said sensing surface is oriented parallel to said axis of rotation; and
   a pair of permanent magnets attached to said rotor in diametric opposition to each other, wherein said magnets have opposite poles facing each other such as to provide a magnetic field passing through said at least one magnetosensitive device at an orientation normal to said axis of rotation, wherein the magnetic field is substantially uniform over an area at least as large as said sensor surface; and wherein each said magnet comprises:
   a predetermined geometrical shape, said shape having a predetermined external asymmetric geometrical feature;
   wherein each said magnet is identical with respect to the other; and
   wherein said external asymmetric geometrical feature differentiates the north and south magnetic poles of each said magnet.

2. The magnets of claim 1, wherein said predetermined external asymmetric geometrical feature is a wedge shape involving a pole face chamfer, wherein each of said north and south poles has a respective pole face, and wherein the pole faces have different areas.

3. The magnets of claim 1, wherein said predetermined external asymmetric geometrical feature is a chamfered corner formed at a pole face of a selected one of said north and south poles.

4. A rotary magnetic position sensor, comprising:
   a stator;
   at least one magnetosensitive device connected with said stator, said at least one magnetosensitive device having a sensing surface;
   a rotor mounted around said stator, wherein one of said stator and said rotor is rotatable about a rotation axis, wherein said sensing surface is oriented parallel to said axis of rotation; and
   a pair of permanent magnets attached to said rotor in diametric opposition to each other, wherein said magnets have opposite poles facing each other such as to provide a magnetic field passing through said at least one magnetosensitive device at an orientation normal to said axis of rotation, wherein the magnetic field is substantially uniform over an area at least as large as said sensor surface; and wherein each said magnet comprises:
   a predetermined geometrical shape, said shape having a predetermined external asymmetric geometrical feature comprising a wedge shape involving a pole face chamfer, wherein each of said north and south poles has a respective pole face, and wherein the pole faces have different areas;
   wherein each said magnet is identical with respect to the other; and
   wherein said external asymmetric geometrical feature differentiates the north and south magnetic poles of each said magnet.

* * * * *